(12) United States Patent
Müller et al.

(10) Patent No.: US 6,539,332 B1
(45) Date of Patent: Mar. 25, 2003

(54) PROCESS FOR FITTING STRUCTURAL UNITS TO VEHICLES

(75) Inventors: Anton Müller, Lenting; Franz Roth, Steinsdorf, both of (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 09/149,102

(22) Filed: Sep. 8, 1998

(51) Int. Cl.⁷ ............................. G01G 7/00; G01G 9/00; G01G 11/00; G01G 17/00; G01G 19/00
(52) U.S. Cl. .......................................... 702/173; 701/37
(58) Field of Search ........................... 702/173; 700/95, 700/117; 701/37

(56) References Cited

U.S. PATENT DOCUMENTS

| | | | | |
|---|---|---|---|---|
| 3,592,278 A | * | 7/1971 | Shumaker | 177/132 |
| 3,855,841 A | * | 12/1974 | Hunter | 73/11 |
| 3,938,377 A | * | 2/1976 | Converse, III et al. | 73/117 |
| 3,965,732 A | * | 6/1976 | Cline | 73/126 |
| 4,175,431 A | * | 11/1979 | DeTournay | 73/161 |
| 4,229,021 A | * | 10/1980 | Schmid et al. | 280/787 |
| 4,651,838 A | * | 3/1987 | Hamilton et al. | 177/209 |
| 4,894,908 A | * | 1/1990 | Haba, Jr. et al. | 29/711 |
| 4,977,524 A | * | 12/1990 | Strege et al. | 364/562 |
| 5,090,105 A | * | 2/1992 | DeRees | 29/469 |
| 5,259,246 A | * | 11/1993 | Stuyts | 73/669 |
| 5,528,496 A | * | 6/1996 | Brauer et al. | 364/424.03 |
| 5,588,660 A | * | 12/1996 | Paddison | 280/95.1 |
| 5,609,353 A | * | 3/1997 | Watson | 280/707 |
| 5,657,233 A | * | 8/1997 | Cherrington et al. | 364/464.1 |
| 5,754,738 A | * | 5/1998 | Saucedo et al. | 395/12 |
| 5,793,648 A | * | 8/1998 | Nagle et al. | 364/512 |

OTHER PUBLICATIONS

Mraz, "It's all in the spring", Machine Design, May 7, 1998, pp. 80–86.*

Kalell–Fox, "DADS steers vehicle design in a new direction", Automotive Engineering, Nov. 1990.*

* cited by examiner

*Primary Examiner*—Patrick Assouad
(74) *Attorney, Agent, or Firm*—Stevens, Davis, Miller & Mosher, LLP

(57) ABSTRACT

A process for installing axle springs on vehicles having different spring supported bodies and components mounted on such bodies, generally consisting of creating a database comprising loads of each of such bodies and components, identifying the body and components of each of such vehicles, accessing the database to retrieve data representing the composite load of the identified body and components, identifying axle springs having load capacity ranges sufficient to support the identified load and installing the identified axle springs on the vehicle body.

6 Claims, 1 Drawing Sheet

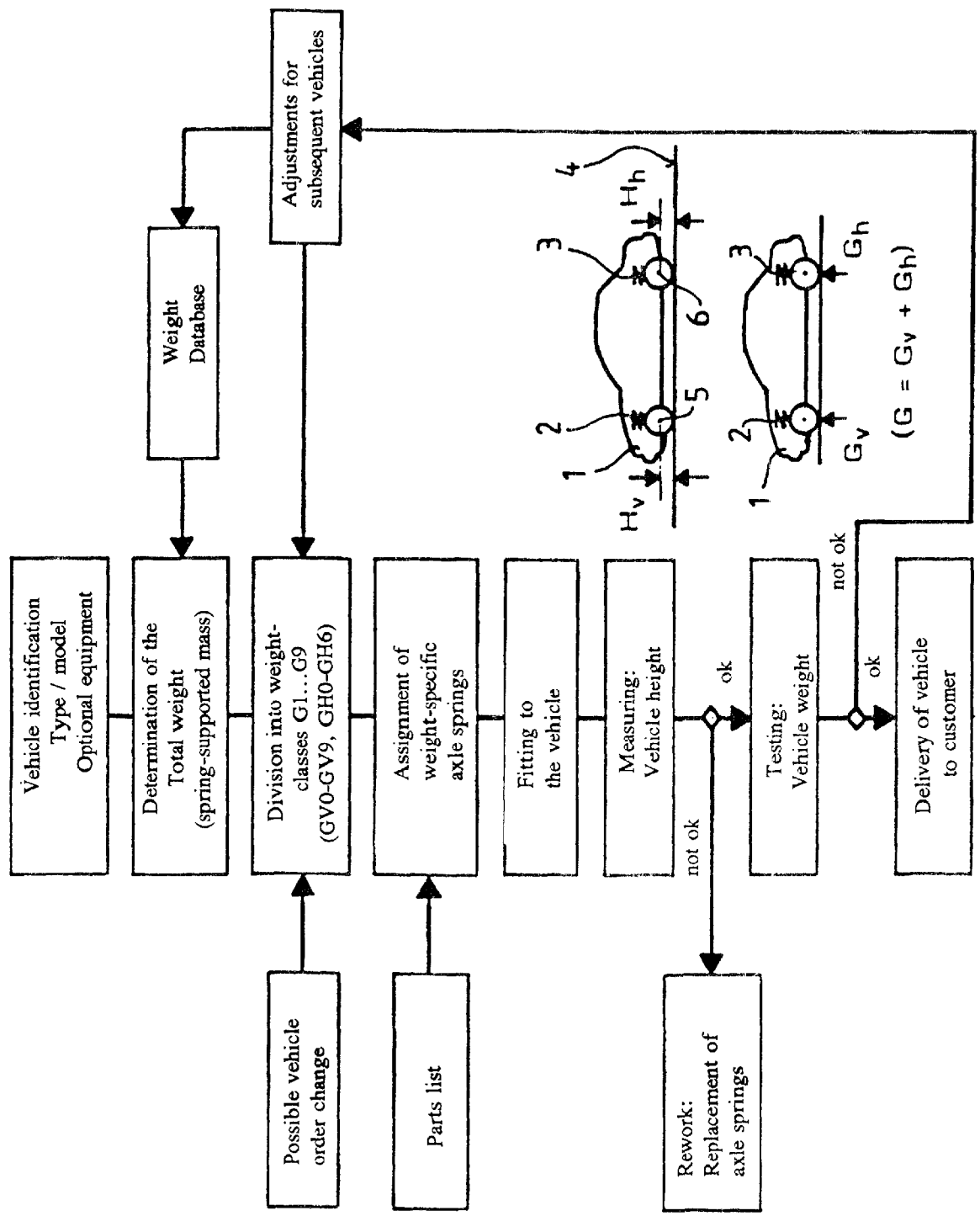

PROCESS FOR FITTING STRUCTURAL UNITS TO VEHICLES

BACKGROUND OF THE INVENTION

The invention relates to a process for fitting structural units to a vehicle, axle springs in particular, the dimensions and/or three-dimensional shape and/or material are/is determined on the basis of the weight of a vehicle.

The range of options currently offered customers in the case of vehicles, and especially passenger automobiles, is distinctly varied. Virtually every automobile manufacturer offers a variety of vehicle types characterized in turn by alternative models determined in detail by the vehicle drive assembly. Every vehicle model in turn has certain basic equipment which may be supplemented by optional equipment items varying in weight (such as air conditioning, heating, sliding roof, trailer attachment, power takeoff equipment, etc.) for an individual vehicle ordered, as desired by the customer. The total weight of individual vehicles may vary widely.

On the other hand, in the overall design of such a vehicle there are structural units whose dimensions and/or three-dimensional shape are to be coordinated with the total vehicle weight. One example is that of the axle springs of wheel suspensions, which ultimately transfer the weight of a vehicle to the wheels. Axle springs which are properly selected (with respect to dimensions, three-dimensional shape, properties of materials) have a favorable effect on the static height and wheel house aspects, the cd factor, riding comfort, driving stability, and so forth.

In practical applications, however, either the same axle springs are always assembled, regardless of the actual volume of equipment or the total weight of a particular vehicle, or the factors most greatly affecting the total weight(such as the drive assembly) are taken into account and suitable axle springs coordinated with these factors are assembled. As a result a vehicle is produced whose individual components are not optimally coordinated with each other.

The object of the invention is accordingly to improve the process of fitting of structural units to vehicle, and axle springs in particular, so that optimum coordination with the actual circumstances, specifically the vehicle weight, may be attained.

BRIEF SUMMARY OF THE INVENTION

The present invention provides a process for installing axle springs on vehicles having different spring supported bodies and components mounted on such bodies which generally consists of creating a database comprising loads of each of the bodies and components, identifying the body and components of each of such vehicles, accessing the database to retrieve the composite load of the identified body and components, identifying axle springs having load capacity ranges sufficient to support the identified load and then installing identified axle springs on the vehicle body.

The invention yields a number of advantages. For instance, if the axle springs cited as examples are included in the structural units, distinctly improved static height quality (ground clearance kept within narrow tolerances) is achieved on the basis of detection of and allowance for the extent of optional equipment relevant to weight. A high/low level resulting from subtracted/added weight is avoided. The extent of equipment of special vehicles (of police, emergency medical personnel, etc.) and volumes of equipment specific to individual countries may also be taken into consideration. If weight changes occur in individual equipment volumes during routine production, as for example as a result of structural modifications, such changes may also be taken into account immediately. Along with potential reduction in alternative structural units (axle springs), the fitting process as a whole may be improved. Different weights for items not spring loaded (such as wheels and tires) need not be considered.

BRIEF DESCRIPTION OF THE DRAWING

The single FIGURE of the drawing is a flow chart of a process for the installation of axle springs in the suspension systems of vehicles.

The invention is discussed in detail in what follows with reference to the flow chart presented in the drawing for a process for fitting of axle springs to vehicle front and rear axles.

The basis for the performance of the process is determined by the individual order for a vehicle, and accordingly by a selection of a specific vehicle model and individual coordination of additional optional equipment ordered by the customer.

The data in a weight database in which the pertinent weight for every vehicle model and every item of optional equipment is stored may be used to determine the relevant total weight (that is, without allowance for objects not supported by springs, such as rims and tires), preferably with breakdown into the weight component for the front axle V and that for the rear axle H.

A minimum weight is obtained on the basis of the stripped-down basic vehicle model and a maximum weight by including all possible optional equipment items. The resulting weight range, again divided into front axle and rear axle components, is then divided into a number of weight classes GV0–GV9 (front axle) and GH0–GH6 (rear axle). Hence each weight class is defined by a relatively narrow range of minimum to maximum weights, and it has been found useful (e.g., because of the significantly heavier equipment alternatives in the area of the engine compartment) to divide the front axle area into a larger number of weight classes than are needed in the rear axle area.

Each weight class GV0–GV9, GH0–GH6 is now associated with specific axle springs 2,3 on the basis of dimensions, three-dimensional shape, and material so that axle springs 2,3 which are exactly suitable may be selected by referring to an appropriate data file and installed on a vehicle. If subsequent change on the basis of optional equipment items is made necessary by customer request, such change can be made even at this relatively late date.

At the end of the fitting process the vehicle 1 passes through a testing station at which the static heights $H_V$ and $H_H$ (distance between the ground 4 and center of the wheel 5, 6) are determined. If test values not falling within a prescribed tolerance range are obtained, the axle springs 2, 3 are to be replaced in an additional operation. The vehicle 1 is otherwise ready for delivery to its customer.

The static height measurement may be supplemented by subsequent weight testing. In this process the theoretical front axle and rear axle weights GV, GH are checked against the weights actually determined on a scale. If values fall below or exceed a certain tolerance (e.g., ±100 N), an adjustment may be made and taken into account for vehicles subsequently modified.

In the process depicted in the flow chart, the type and model of the vehicle and the optional equipment on the vehicle are first identified and data representing such identification is then transmitted to a suitable computer. The computer then accesses the database to retrieve and then compute the total weight of the vehicle and optional equipment. In addition, the computer divides the determined load between the front and rear axles of the vehicle. According to the load class of the vehicle as determined by computer, specific axle springs for the vehicle are identified. Such springs are then mounted on the vehicle and the clearance height of the vehicle is measured to determine whether it falls within selected tolerances. If the clearance height is found to be proper, the vehicle is then weighed and data representing such weight are transmitted to the computer database and any adjustment to the data contained in the database is made. If the clearance height of the vehicle body is found to fall outside of such tolerances, the vehicle is reworked by replacing the springs with springs having a proper load capacity.

From the foregoing detailed description it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. A process for installing axle springs on vehicles having different spring supported bodies and components mounted on said bodies, comprising:

creating a database comprising loads of each of said bodies and components;

identifying the body and components of each of said vehicles;

accessing said database to retrieve the composite load of the identified body and components;

identifying axle springs having load capacity ranges sufficient to support said identified load; and installing said identified axle springs on said vehicle body.

2. A process according to claim 1 including:

computing the loads to be supported by the front and rear axles of said vehicle by dividing said composite load;

accessing said database to retrieve the loads to be supported by each of said axles;

identifying an axle spring having a load capacity range sufficient to support a load of each of said axles; and installing said identified axle springs on said axles.

3. A process according to claim 1 including identifying axle springs having load capacity ranges sufficient to provide a selected height of said body above a support level of the vehicle within selected tolerances.

4. A process according to claim 1 including determining the load of said body and components by computing the individual weights of said bodies and components stored in said database.

5. A process according to claim 4 including measuring the loads imposed on the front and rear axle of a vehicle following the installation of said springs.

6. A process according to claim 5 including adjusting the load values of said database responsive to said measured loads.

* * * * *

UNITED STATES PATENT AND TRADEMARK OFFICE
CERTIFICATE OF CORRECTION

PATENT NO. : 6,539,332 B1
DATED : March 25, 2003
INVENTOR(S) : Anton Muller and Franz Roth It is certified that error appears in the above-identified patent and that said Letters Patent is hereby corrected as shown below:

<u>Title page,</u>
Immediately following Item [22], please add the following:
-- Related U.S. Application Data
[63] Continuation of application No. PCT/EP97/00257, filed January 17, 1997, now abandoned.
[30] Foreign Application Priority Data
    March 8, 1996 (DE)……………………………………..196 08 999.9 --

<u>Column 1,</u>
Line 4, please insert the following paragraph:
-- This application is a continuation of PCT/EP97/00257, filed January 17, 1997, now abandoned, claiming priority to German Application No. DE 196 08 999.9, filed March 8, 1996. --

Signed and Sealed this

Ninth Day of September, 2003

JAMES E. ROGAN
*Director of the United States Patent and Trademark Office*